(12) United States Patent
Bikmukhametov (10) Patent No.: US 11,075,566 B2
(45) Date of Patent: Jul. 27, 2021

(54) ELECTRIC MOTOR

(71) Applicant: ARRIVAL LIMITED, Banbury (GB)

(72) Inventor: Alexey Bikmukhametov, Saint-Petersburg (RU)

(73) Assignee: ARRIVAL LIMITED, Banbury (GB)

(*) Notice: Subject to any disclaimer, the term of this patent is extended or adjusted under 35 U.S.C. 154(b) by 0 days.

(21) Appl. No.: 16/487,375

(22) PCT Filed: Feb. 19, 2018

(86) PCT No.: PCT/GB2018/050429
§ 371 (c)(1),
(2) Date: Aug. 20, 2019

(87) PCT Pub. No.: WO2018/150200
PCT Pub. Date: Aug. 23, 2018

(65) Prior Publication Data
US 2020/0028411 A1    Jan. 23, 2020

(30) Foreign Application Priority Data

Feb. 20, 2017  (RU) .......................... RU2017105408

(51) Int. Cl.
*H02K 7/116*    (2006.01)
*H02K 1/27*    (2006.01)
(Continued)

(52) U.S. Cl.
CPC ............ *H02K 7/116* (2013.01); *H02K 1/274* (2013.01); *H02K 3/28* (2013.01)

(58) Field of Classification Search
CPC .......... H02K 7/116; H02K 1/274; H02K 3/28; H02K 27/00; F16H 2057/02034
See application file for complete search history.

(56) References Cited

U.S. PATENT DOCUMENTS 4,291,248 A * 9/1981 Rainbolt ............... H02K 25/00
                                                        310/14
6,037,692 A  3/2000 Miekka
(Continued)

FOREIGN PATENT DOCUMENTS

| CN | 1123485 | 5/1996 |
| GB | 2521653 | 12/2013 |
| JP | 2009081982 | 4/2016 |

OTHER PUBLICATIONS

PCT Search Report for corresponding International Application No. PCT/GB2018/050429 dated Apr. 5, 2018, 9 pages.
(Continued)

*Primary Examiner* — Tisha D Lewis
(74) *Attorney, Agent, or Firm* — Lee & Hayes, P.C.

(57) ABSTRACT

An electric motor having a rotor having permanent magnets and a first gear arranged on an inner surface of the rotor, a stator having electromagnetic coils wound around sections of the rotor, a shaft arranged to be rotatably supported in the electric motor, the shaft having a second gear arranged on an outer surface of the shaft, and at least one rotary gear member arranged in a space between the first gear and the second gear. A number of the permanent magnets is the same as a number of the electromagnetic coils, and both the permanent magnets and the electromaqnetic coils are evenly spaced apart in a circumferential manner. The rotor further having a plurality of non-magnetic sections positioned between the plurality of permanent magnets to form an outermost layer of the rotor.

11 Claims, 5 Drawing Sheets

(51) Int. Cl.
*H02K 3/28* (2006.01)
*F16H 57/02* (2012.01)

(56) References Cited

U.S. PATENT DOCUMENTS

| | | | | |
|---|---|---|---|---|
| 6,252,317 B1* | 6/2001 | Scheffer | ............... | H02K 1/272 |
| | | | | 310/267 |
| 2009/0058214 A1* | 3/2009 | Mizushima | ............ | H02K 7/116 |
| | | | | 310/203 |
| 2010/0219725 A1* | 9/2010 | Yamagata | ............. | H02K 7/116 |
| | | | | 310/68 B |
| 2014/0049094 A1* | 2/2014 | Cho | ....................... | B60L 50/51 |
| | | | | 301/6.5 |

OTHER PUBLICATIONS

Chinese Office Action from corresponding Chinese Patent Application No. 201880022476.1 dated Dec. 13, 2020, 10 pages.
GB Examination Report for corresponding GB Patent Application No. 18707135.2 dated Dec. 17, 2020, 7 pages.

\* cited by examiner

FIG. 3

ELECTRIC MOTOR

This Application is a US National Phase application filed under 35 USC § 371 of PCT Application PCT/GB2018050429, filed Feb. 19, 2018, which claims priority to RU Application 2017105408, filed Feb. 20, 2017, which is incorporated herein by reference.

FIELD

This specification relates to an electric motor, particularly but not exclusively to an electric motor which operates without requiring use of rotor position sensors or computer processors.

BACKGROUND

In part due to concerns regarding air pollution and instability of petroleum prices, there has been increasing growth in interest in electric vehicles, in particular electric vehicles which adopt advanced drive systems and vehicle power systems using induction motors. These electric vehicles require motors which are small in size, lightweight, and low-cost with high efficiency.

A number of different types of electric motors have been used to provide the power requirements of the electric vehicles. In currently known electric motor configurations, at least one rotor and one stator are provided, wherein the rotor is mounted on a shaft axially relative to the stator. The flux generates a magnetic field in an air gap between the stator and the rotor and induces a voltage which produces current through the rotor bars. The rotor circuit is shorted and current flows in the rotor conductors. The action of the rotating flux and the current produces a force that generates a torque to start the motor.

SUMMARY

In a first aspect, this specification describes an electric motor comprising: a rotor having at least one permanent magnet and a first gear arranged on an inner surface of the rotor; a stator comprising at least one electromagnetic coil wound around a section of the rotor; a shaft arranged to be rotatably supported in the electric motor, the shaft comprising a second gear arranged on an outer surface of the shaft; at least one rotary gear member arranged in a space between the first gear and the second gear, wherein the at least one rotary gear member is in meshing engagement with the first gear and the second gear, wherein when current passes through the at least one electromagnetic coil, a magnetic field is generated to cause the rotor to rotate, thereby transferring torque to the shaft through meshing between the first gear and the at least one rotary gear member, and meshing between the second gear and the at least one rotary gear member.

The space between the first gear of the rotor and the second gear of the shaft may be a circumferential space.

The first gear may comprise a plurality of teeth formed on the inner surface of the rotor, each of the teeth projecting towards the centre of the rotor radially, and the second gear may comprise a plurality of teeth formed on the outer surface of the shaft, each of the teeth extending radially from a centre of the shaft.

The rotor may comprise a plurality of permanent magnets spaced apart evenly in a circumferential manner, and the stator may comprise a plurality of electromagnetic coils wound around sections of the rotor. The plurality of electromagnetic coils may be spaced apart evenly in a circumferential manner.

The number of the plurality of permanent magnets in the rotor may be the same as the number of the plurality of electromagnetic coils.

Current may be passed through the plurality of electromagnetic coils simultaneously.

The direction of the current passing through the plurality of electromagnetic coils may be the same in each coil.

Current may be passed through each of the plurality of electromagnetic coils sequentially.

The rotor may further comprise a plurality of non-magnetic sections positioned between the plurality of permanent magnets.

The plurality of permanent magnets may each comprise opposite magnetic poles, and the opposite magnetic poles in each of the plurality of permanent magnets may be arranged such that they correspond rotationally along the circumference of the rotor.

The rotor may further comprise a non-magnetic layer arranged between the at least one permanent magnet and the first gear.

The electric motor may comprise a plurality of rotary gear members arranged in the space between the first gear of the rotor and the second gear of the shaft.

The plurality of rotary gear members may be spaced apart evenly in the space between the first gear of the rotor and the second gear of the shaft.

Each of the plurality of rotary gear members may have its own stationary axis of rotation.

The shaft may comprise a hollow centre.

BRIEF DESCRIPTION OF THE DRAWINGS

For a more complete understanding of the aspects described herein, reference is now made to the following descriptions taken in connection with the accompanying drawings in which.

DETAILED DESCRIPTION

In known types of synchronous brushless motors, the rotor comprises permanent magnets with magnetic poles arranged to be spaced apart circumferentially such that when current passes through the stator electromagnetic coils, the rotor rotates incrementally from one magnetic pole to another to drive a central motor shaft. These types of known electric motors require the use of a rotor position sensor so as to accurately switch on and off the current in the stator electromagnetic coils as well as a central processing unit (CPU) to control the switching. In addition, it is required in these known types of electric motors to create specific software for the CPU to effectively manage the switching control.

The aspects described below provide an improved electric motor in terms of overall electrical and mechanical performance. In particular, these aspects provide an electric motor with increased power efficiency as well as improved dynamic and traction properties, while having a reduced size due to absence of any rotor position sensors (e.g. Hall sensor, resolver, etc.) and computer processors. Moreover, for this reason, the costs for manufacturing the electric motor according to these aspects are reduced.

Figure 1A:
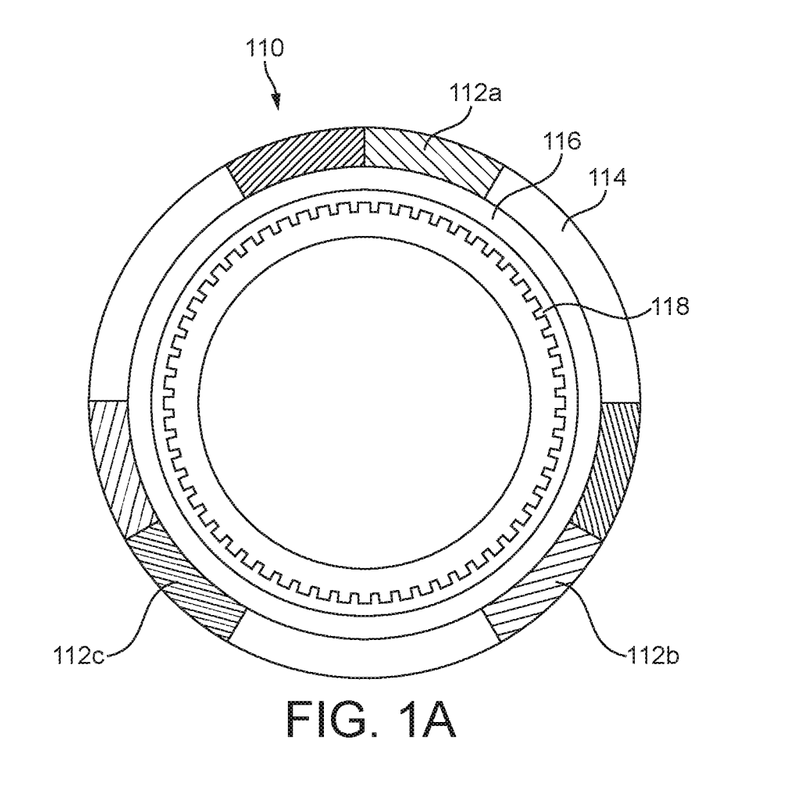
FIG. 1A is a front view of a rotor of an electric motor.
Figure 1B:
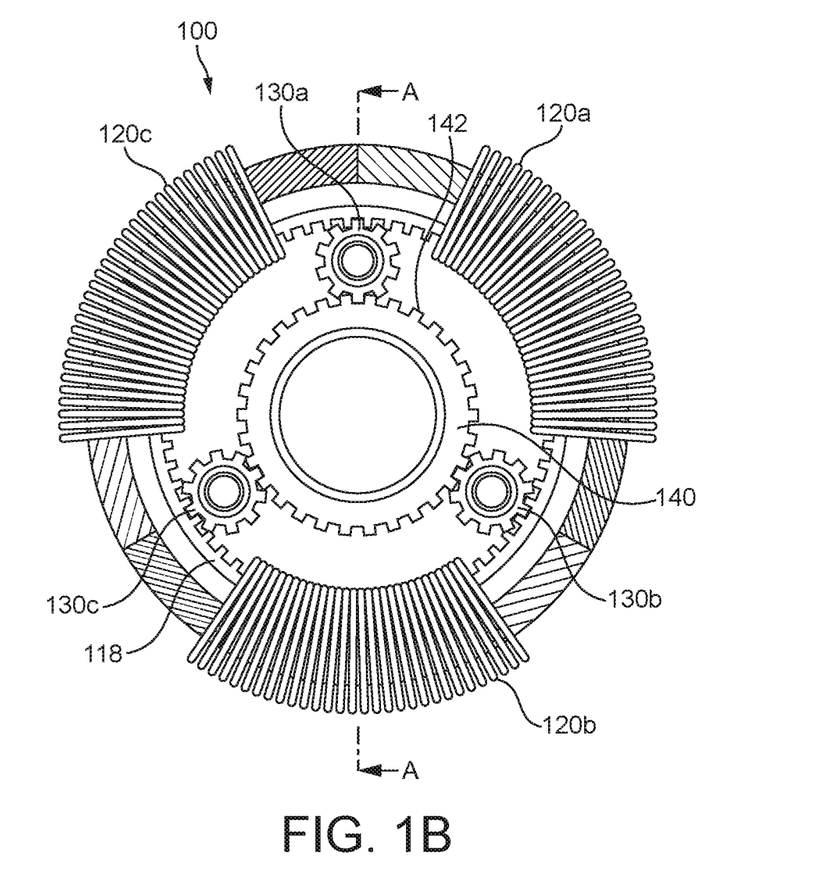
FIG. 1B is a front view of an electric motor including the rotor of FIG. 1A.
Figure 1C:
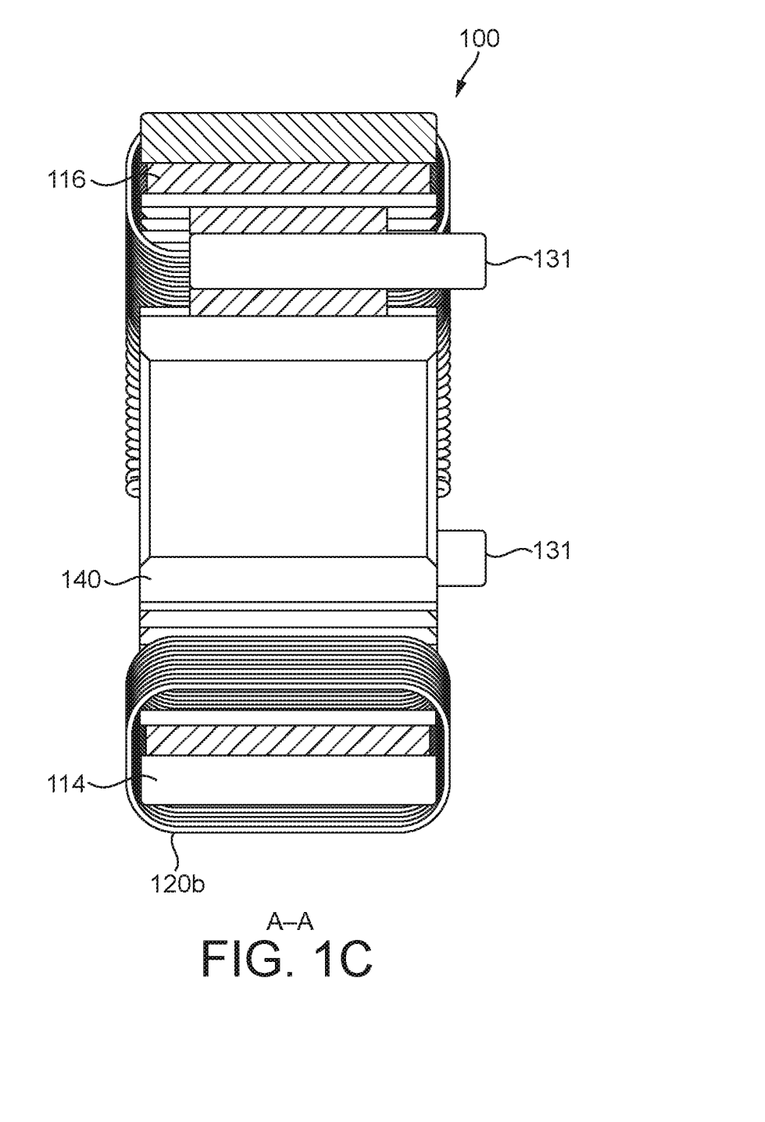
FIG. 1C is a side cross-sectional view of the electric motor of FIG. 1B.
Figure 2:
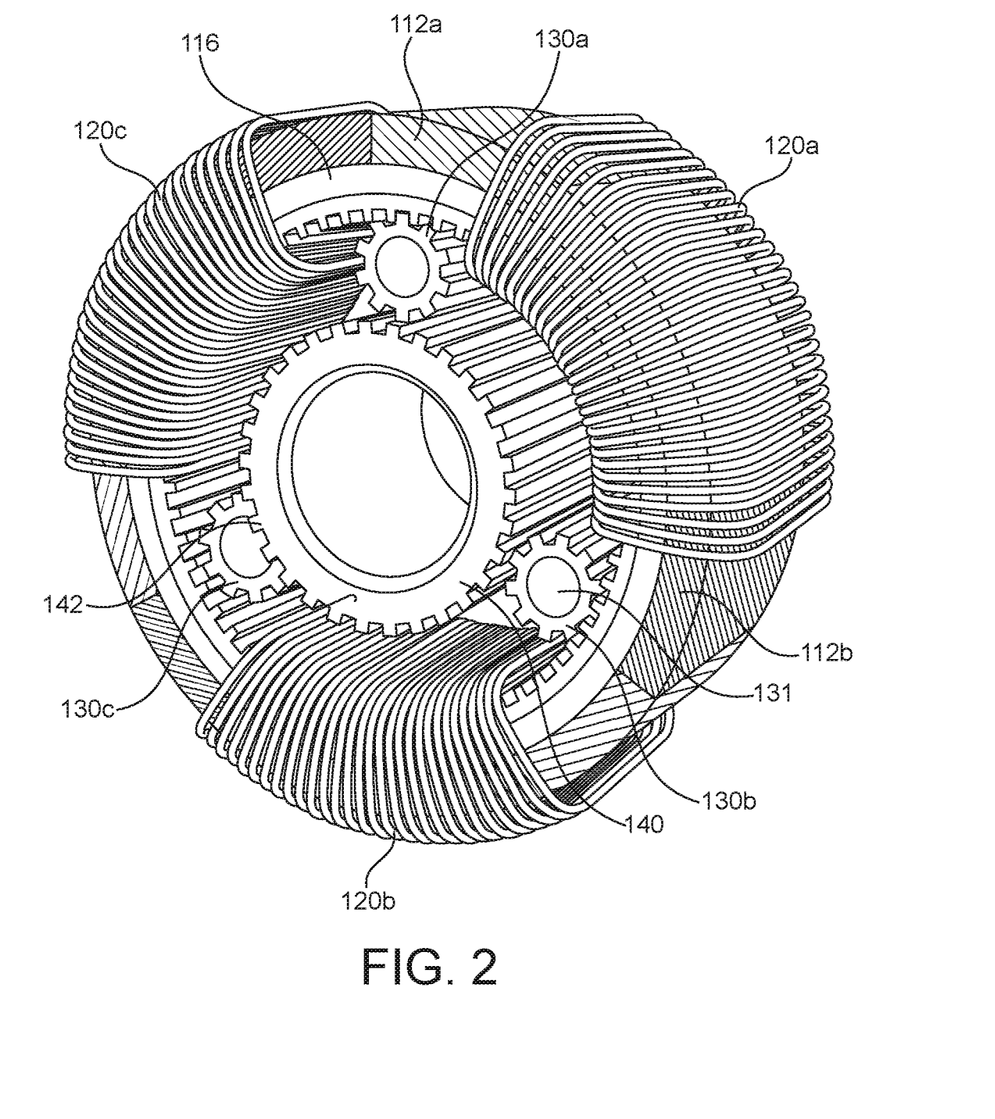
FIG. 2 is a perspective view of the electric motor of FIG. 1B in an assembled state.
Figure 3:
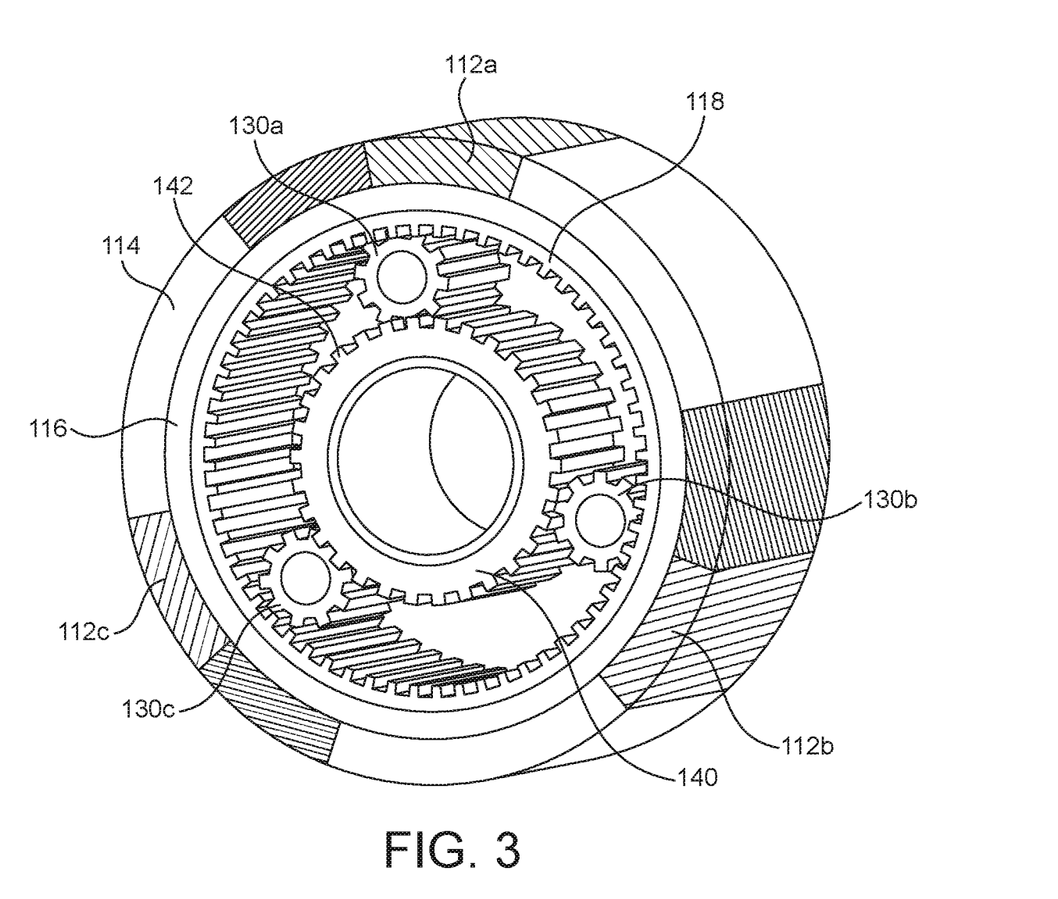
FIG. 3 is a perspective view of the electric motor of FIG. 1B with the stator removed.

FIGS. 1A, 1B, and 1C are respectively a front view of a rotor of an electric motor, a front view of the electric motor, and the side cross-sectional view of the electric motor. FIG. 2 is a perspective view of the electric motor of FIG. 1B, and FIG. 3 is a perspective view of the electric motor of FIG. 1B with the stator removed.

The rotor 110, as illustrated in FIG. 1A individually and separate from the other components of the electric motor, comprises a first permanent magnet 112a, a second permanent magnet 112b, a third permanent magnet 112c, a plurality of intermediate sections 114, a non-magnetic layer 116, and a first gear 118. A perspective side view of the rotor 110 is more clearly shown in FIG. 3.

The first, second, and third permanent magnets 112a, 112b, 112c each comprises opposite magnetic poles (i.e. north pole and south pole), wherein the opposite magnetic poles in each of the first, second and third permanent magnets are arranged such that they correspond rotationally along the circumference of the rotor 110. Therefore, the plurality of permanent magnets 112a, 112b, 112c of the rotor 110 all have the same magnetic orientation within the rotor 110 as the rotor 110 rotates.

Each of the plurality of intermediate sections 114 of the rotor 110 comprises non-magnetic material. These sections 114 serve as buffer zones in the rotor 110 between the plurality of permanent magnets 112a, 112b, 112c in order to prevent the magnetic fields at the magnetic poles of the different permanent magnets from influencing each other. The plurality of sections 114 are respectively positioned between the first permanent magnet 112a and the second permanent magnet 112b, between the second permanent magnet 112b and the third permanent magnet 112c, and between the third permanent magnet 112c and the first permanent magnet 112a, as illustrated in FIG. 1A. In other words, the first, second, and third permanent magnets 112a, 112b, 112c and the plurality of sections 114 form an outermost layer of the rotor 110.

The non-magnetic layer 116 of the rotor 110 is located between the outermost layer of the rotor (i.e. the layer comprising the first, second, and third permanent magnets 112a, 112b, 112c and the plurality of sections 114) and a first gear 118. The non-magnetic layer 116 serves to prevent magnetic fields at the magnetic poles of each of the permanent magnets from forming a loop within the rotor 110, which may produce an undesired effect on the operation of the electric motor 100. For example, a magnetic field loop formed in an inner layer of the rotor 110 would potentially counteract magnetic fields generated by the electromagnetic coils in the electric motor thus reducing the efficiency of the electric motor.

The first gear 118 comprises a plurality of teeth formed on an inner surface of the rotor 110, each of the teeth projecting towards the centre of the rotor radially. As shown in FIG. 1B, the first gear 118 is in a meshing engagement with a plurality of rotary gear members 130a, 130b, 130c so as to transfer torque from the rotor 110 to a shaft 140. This will be explained in further detail below.

As shown in FIGS. 1B, 1C, and 2, the electric motor 100 (herein referred to as "the motor") comprises the rotor 110 of FIG. 1A, a plurality of electromagnetic coils 120a, 120b, 120c, a plurality of rotary gear members 130a, 130b, 130c, and a shaft 140.

The first electromagnetic coil 120a, the second electromagnetic coil 120b, and the third electromagnetic coil 120c are individually wound around the rotor 110, and in an initial state the plurality of electromagnetic coils 120a, 120b, 120c are positioned such that they correspond to the plurality of sections 114 between the permanent magnets 112a, 112b, 112c circumferentially. This initial state is illustrated in FIG. 1B. Each of the plurality of electromagnetic coils 120a, 120b, 120c comprises a plurality of windings. When current passes through an electromagnetic coil, a magnetic field is generated which passes through the centre of the electromagnetic coil. A permanent magnet positioned in the vicinity of the generated magnetic field would be caused to move under the influence of the magnetic field.

For example, starting from the initial state as shown in FIG. 1B, current may pass through the first electromagnetic coil 120a so as to generate a first magnetic field which causes the first permanent magnet 112a to move towards and through the centre of the first electromagnetic coil 120a. The movement of the first permanent magnet 112a causes the rotor 110 to rotate in a clockwise direction. At the same time, current also passes through the second and third electromagnetic coils 120b, 120c so as to respectively generate a second magnetic field and a third magnetic field, wherein the directions of the first, second, and third magnetic field are all substantially aligned along the circumference of the electric motor 100. Under the second and third magnetic fields, the second permanent magnet 112b and the third permanent magnet 112c respectively move towards and through the centre of the second electromagnetic coil 120b and of the third electromagnetic coil 120c, thereby increasing the efficiency of the rotation of the rotor 110. As explained above, the plurality of permanent magnets 112a, 112b, 112c of the rotor 110 all have the same magnetic orientation within the rotor 110 as the rotor 110 rotates. Accordingly, the direction of rotation of the rotor 110 is dependent on direction of the current passing through the plurality of electromagnetic coils 120a, 120b, 120c. For maximum efficiency, the direction of the current passing through the plurality of electromagnetic coils 120a, 120b, 120c should be the same (i.e. clockwise or anticlockwise through the coils).

As shown in FIG. 1B, a first rotary gear member 130a, a second rotary gear member 130b, and a third rotary gear member 130c are positioned within a circumferential space between the rotor 110 and the shaft 140. Specifically, the plurality of rotary gear members 130a, 130b, 130c are positioned between the first gear 118 of the rotor 110 and a second gear 142 located on the shaft 140. Each of the plurality of rotary gear members 130a, 130b, and 130c comprises a plurality of teeth which allow them to be in a meshing engagement with both the first gear 118 and the second gear 142 such that torque can be transferred from the rotor 110 to the shaft 140. In addition, each of the plurality of rotary gear members 130a, 130b, and 130c has its own stationary axis of rotation.

The shaft 140 is a hollow cylinder positioned axially relative to the rotor 110 and is rotatably supported in the electric motor 100. As outlined above, the shaft 140 comprises a second gear 142 which is arranged on an outer surface of the shaft 140. The shaft 140 may, for example, be made of steel or other suitable magnetic material. The second gear 142 comprises a plurality of teeth formed on the outer surface of the shaft 140, each of the teeth extending radially from a centre of the shaft 140. As explained above, the plurality of rotary gear members 130a, 130b, 130c can mesh with the second gear 142 so as to transfer torque from the rotor 110 to the shaft 140.

The first electromagnetic coil 120a, the second electromagnetic coil 120b, the third electromagnetic coil 120c, together with the first rotary gear member 130a, the second rotary gear member 130b, and the third rotary gear member 130c form the stator of the electric motor 100. Although the plurality of rotary gear members 130a, 130b, and 130c form part of the stator, it is noted that each of the plurality of rotary gear members is able to rotate within the stator. As mentioned above, each of the plurality of rotary gear members has its own stationary axis of rotation within the stator.

A sequence of the operation of the electric motor 100 is described below:

Current is passed through the first, second, and third electromagnetic coils at the same time, such that the first magnetic field, the second magnetic field, and the third magnetic field are respectively generated at the electromagnetic coils. The directions of the first, second, and third magnetic field are all substantially aligned along the circumference of the electric motor 100.

Starting from the initial position as shown in FIG. 1B, each of the first magnetic field, the second magnetic field, and the third magnetic field cause permanent magnets 112a-c located adjacent to the coils 120a-c to move along a magnetic direction of each of the magnetic fields. For example, the first magnetic field generated by the first electromagnetic coil causes the first permanent magnet 112a to move towards and through the centre of the first electromagnetic coil 120a. At the same time, the second and third magnetic fields generated respectively by the second and third electromagnetic coils respectively cause the second and third permanent magnets 112b, 112c to respectively move towards and through the centres of the second and third electromagnetic coils 120b, 120c.

The movement of the first, second, and third permanent magnets causes the rotor 110 to rotate, and in the particular configuration as shown in FIG. 1B, the rotor 110 is caused to rotate in a clockwise direction. The collective magnetic effect provided by the first, second, and third electromagnetic coils 120a, 120b, 120c increases the efficiency of the rotation of the rotor 110.

Due to the arrangement of the first gear 118 of the rotor 110, the first, second, and third rotary gears 130a, 130b, 130c, and the second gear 142 of the shaft 140, rotation of the rotor 110 causes torque to be transferred from the rotor 110, through meshing between the first gear 118 and the plurality of rotary gears 130a, 130b, 130c, to the shaft 140, through meshing between the plurality of rotary gears 130a, 130b, 130c and the second gear 142 of the shaft 140. Therefore, the shaft 140 is caused to rotate. The shaft 140 can be used to drive a component mechanically connected to the shaft 140, such as a vehicle axle.

Since current is passed through the first, second, and third electromagnetic coils 120a, 120b, 120c at the same time in the operation of the electric motor 100, there is no requirement for any rotor position sensors in the electric motor 100 for the purpose of detecting a position of the rotor and controlling switching of current in response. In addition, due to the same reason, there is also no requirement for a processing unit to control switching of the current in these electromagnetic coils. The elimination of these components from the electric motor allows for a more compact and lightweight configuration.

Although it is described above that the rotor comprises a first, second, and third permanent magnets, in alternative embodiments a different number of permanent magnet(s) may be provided. For example, in some alternative embodiments, the rotor may comprise six permanent magnets in relatively reduced size arranged along the circumference in the outer layer of the rotor. In these alternative embodiments, the electric motor may comprise an equivalent number of electromagnetic coils so as to achieve a high efficiency of operation. In some embodiments, the electric motor may comprise at least one permanent magnet and at least one electromagnetic coil.

Although it is described above that current passes through the first electromagnetic coil, the second electromagnetic coil, and the third electromagnetic coil at the same time, in alternative embodiments, current may not pass through all the electromagnetic coils simultaneously. In some alternative embodiments in which the electric motor comprises a plurality of electromagnetic coils, the electric motor may be configured such that the current only passes through one or some of the electromagnetic coils at any one time. In some alternative embodiments in which the electric motor comprises a plurality of electromagnetic coils, the electric motor may be configured such that current passes through each of the plurality of electromagnetic coils sequentially.

Although it is described above that the electric motor comprises first, second, and third rotary gear members, in alternative embodiments a different number of rotary gear members may be provided, depending on the dimensions, power requirements, and cost requirements of the electric motor.

Although it is described above that the plurality of intermediate sections in the electric motor comprises non-magnetic material, in alternative embodiments, the plurality of sections may comprise magnetic material.

Although it is described above that the electric motor comprises a non-magnetic layer, in alternative embodiments the electric motor may not comprise such a non-magnetic layer. In these alternative embodiments, the first gear of the electric motor may comprise non-magnetic material so as to minimise undesired magnetic effects on the plurality of permanent magnets and the plurality of electromagnetic coils.

Although the various aspects of the present disclosure are set out in the independent claims, other aspects of the present disclosure comprise other combinations of features from the described embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. An electric motor comprising:
   a rotor having a plurality of permanent magnets and a first gear arranged on an inner surface of the rotor;
   a stator comprising a plurality of electromagnetic coils wound around sections of the rotor;
   a shaft arranged to be rotatably supported in the electric motor, the shaft comprising a second gear arranged on an outer surface of the shaft;
   at least one rotary gear member arranged in a space between the first gear and the second gear, wherein the at least one rotary gear member is in meshing engagement with the first gear and the second gear, wherein when current passes through at least one electromagnetic coil of the plurality of electromagnetic coils, a magnetic field is generated to cause the rotor to rotate, thereby transferring torque to the shaft through meshing between the first gear and the at least one rotary gear member, and meshing between the second gear and the at least one rotary gear member;

wherein a number of the permanent magnets is the same as a number of the electromagnetic coils the permanent magnets are evenly spaced apart in a circumferential manner, the electromagnetic coils are evenly spaced apart in a circumferential manner, and wherein the rotor further comprises a plurality of non-magnetic sections positioned between the plurality of permanent magnets, and a non-magnetic layer arranged between the at least one permanent magnet and the first gear, such that the plurality of permanent magnets and the plurality of non-magnetic sections form an outermost layer of the rotor.

2. The electric motor according to claim 1, wherein the space between the first gear of the rotor and the second gear of the shaft is a circumferential space.

3. The electric motor according to claim 1, wherein the first gear comprises a plurality of teeth formed on the inner surface of the rotor, each of the teeth projecting towards a central axis of the rotor radially, and the second gear comprises a plurality of teeth formed on the outer surface of the shaft, each of the teeth extending radially from a centre of the shaft.

4. The electric motor according to claim 1, wherein current is passed through the plurality of electromagnetic coils simultaneously.

5. The electric motor according to claim 4, wherein a direction of the current passing through the plurality of electromagnetic coils is the same in each coil.

6. The electric motor according to claim 1, wherein current is passed through each of the plurality of electromagnetic coils sequentially.

7. The electric motor according to claim 1, wherein the plurality of permanent magnets each comprises opposite magnetic poles, and the opposite magnetic poles in each of the plurality of permanent magnets are arranged such that they correspond rotationally along the circumference of the rotor.

8. The electric motor according to claim 1, comprising a plurality of rotary gear members arranged in the space between the first gear of the rotor and the second gear of the shaft.

9. The electric motor according to claim 8, wherein the plurality of rotary gear members are spaced apart evenly in the space between the first gear of the rotor and the second gear of the shaft.

10. The electric motor according to claim 8, wherein each of the plurality of rotary gear members has its own stationary axis of rotation.

11. The electric motor according to claim 1, wherein the shaft comprises a hollow centre.

* * * * *